United States Patent
Iwakata et al.

(10) Patent No.: US 6,945,536 B2
(45) Date of Patent: Sep. 20, 2005

(54) OIL SEAL

(75) Inventors: Keisaku Iwakata, Oyama (JP); Tomoki Shimauchi, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/383,049

(22) Filed: Mar. 6, 2003

(65) Prior Publication Data

US 2003/0168817 A1 Sep. 11, 2003

(30) Foreign Application Priority Data

Mar. 8, 2002 (JP) ........................................ 2002-064340

(51) Int. Cl.[7] ............................................... F16J 15/32
(52) U.S. Cl. ........................ 277/552; 277/563; 277/572
(58) Field of Search ................................ 277/552, 562, 277/563, 572, 576

(56) References Cited

U.S. PATENT DOCUMENTS

| | | | | |
|---|---|---|---|---|
| 3,685,838 A | * | 8/1972 | Malmstrom | 277/560 |
| 4,344,631 A | * | 8/1982 | Winn | 277/552 |
| 4,522,411 A | * | 6/1985 | Burgan | 277/552 |
| 4,550,920 A | * | 11/1985 | Matsushima | 277/559 |
| 4,739,998 A | * | 4/1988 | Steusloff et al. | 277/309 |
| 4,818,620 A | * | 4/1989 | Pilkington | 277/568 |
| 4,844,480 A | * | 7/1989 | Gralka | 277/552 |
| 5,009,435 A | * | 4/1991 | Villanyi et al. | 277/552 |
| 5,199,718 A | * | 4/1993 | Niemiec | 277/552 |
| 5,209,502 A | * | 5/1993 | Savoia | 277/562 |
| 5,727,794 A | * | 3/1998 | Fauchon et al. | 277/551 |
| 6,168,164 B1 | * | 1/2001 | Toth et al. | 277/559 |
| 6,257,587 B1 | * | 7/2001 | Toth et al. | 277/309 |
| 6,293,558 B1 | * | 9/2001 | Crapart | 277/552 |
| 6,364,316 B1 | * | 4/2002 | Arora | 277/355 |
| 6,561,519 B1 | * | 5/2003 | Frese et al. | 277/549 |
| 6,783,130 B2 | * | 8/2004 | Hashida et al. | 277/551 |

FOREIGN PATENT DOCUMENTS

DE 3236636 A1 * 4/1984

* cited by examiner

*Primary Examiner*—Alison K. Pickard
(74) *Attorney, Agent, or Firm*—Frishauf, Holtz, Goodman & Chick, P.C.

(57) ABSTRACT

A two liquid type oil seal 10 having a first seal 13 and a second seal 14, is provided with a communication hole 16 in the first seal 13. The communication hole 16 communicates a space 24 defined by the first and second seals 13, 14 and a crank shaft 2, with a gap 25 between an outer casing 11 and the first seal 13. Negative pressure induced in the space 24 is eliminated by sucking air from the outside through the communication hole 16 while lubrication oil having entered into the space 24 is removed from a groove 15 which is formed in the first and second seals 13, 14, thereby it is possible to restrain the first and second seals 13, 14 from being worn.

8 Claims, 8 Drawing Sheets

OIL SEAL

BACKGROUND OF THE INVENTION

1. Field of the Invention

The present invention relates to an oil seal, and in particular to an oil seal of a two liquid type in which liquid is present on both sides of the oil seal.

2. Description of Related Art

Heretofore, an oil seal fitted on a rotary shaft has a rubber lip which is urged so as to be radially pressed in order to prevent lubrication oil or the like from leaking around the rotary shaft. There have been known several kinds of oil seals including a one liquid type one having a single lip for preventing lubrication around a rotary shaft from leaking from one side to the other side of the oil seal, and a two liquid type one having lips provided on both side of the oil seal, for preventing lubrication oils on the respective sides from leaking from one side to the other side or vise versa. The two liquid type oil seal is provided, for example, between the outer periphery of a crank shaft of an engine and the inner periphery of a flywheel in order to seal against engine oil fed onto the crank shaft and lubrication oil fed onto a clutch disc on the flywheel side or a transmission.

In the above-mentioned two liquid type oil seal, each of both lips is formed on a surface thereof making contact with the rotary shaft with a spiral groove for forcing the lubrication oil having entered between both lips toward the outside of the oil seal. The lubrication oil trapped between both lips is driven into the grooves when the rotary shaft is rotated, and is then spirally forced out by the rotation. During the operation in a normal condition, negative pressure, which is induced in a space defined by both lips and the rotary shaft as the lubrication oil is driven out, is made up for with air sucked thereinto through gaps between the lips and the rotary shaft.

By the way, as to the material of the two liquid type oil seal, there has been known a fluororubber, silicone rubber, nitric rubber or the like. However, since the oil seal is used making contact with a rotary member, it is likely to wear being susceptive to a use condition including a rotational speed and a temperature, and accordingly, the development of a material which is excellent in wear-resistance has been desired. Thus, these years, oil seals made of polytetrafuluoroethylene (PTFE) have been used prosperously. This material is nonadhesive and less frictional, and is excellent in wear-resistance and heat-resistance in comparison with conventional rubber so as to be frequently used for oil seals in engines which are used at a high temperature. An oil seal made of PTFE has lips which have a high stiffness and are hardly deformed, and accordingly, even though negative pressure is induced, air can be soon introduced through gaps between the lips and a rotary shaft so as to satisfactorily make up for the negative pressure.

However, under such a condition that lubrication oil is always fed to the rotary shaft and the oil seal due to a state of excessive lubrication, the lips of the oil seals are always soaked in the lubrication oil. In this case, the oil seal continuously forces the lubrication oil toward the outside thereof, and accordingly, even with an oil seal made of PTFE, it would be caused that negative pressure is inevitably induced in a space defined by the lips and the rotary shaft.

In the above-mentioned condition, the bearing of the oil seal becomes excessively high due to the negative pressure, and accordingly, abnormal heat would be caused at the sliding surfaces of the lips. Due to a temperature rise, lubrication oil at the sliding surfaces of the lips is deteriorated so that the spiral grooves are filled therein with deterioration product, and accordingly, the oil seal fails to normally force the lubrication toward the outside thereof, resulting in deterioration of sealing. Further, due to an increase in the bearing of the oil seal, abnormal abrasion is caused so as to determine the durability of the oil seal.

SUMMARY OF THE INVENTION

An object of the present invention is to provide an oil seal which can prevent occurrence of negative pressure even under a state of excessive lubrication and which is excellent in durability.

To the end, according to the present invention, a negative pressure relief passage is formed in the oil seal.

Specifically, an oil seal according to the present invention, as stated in claim 1, which is provided at the outer peripheral position of a rotary shaft so as to seal against two liquids, that is, first and second liquids, is characterized by a first seal for sealing a first liquid side of the rotary shaft, a second seal for sealing a second liquid side of the rotary shaft, a seal part for sealing over the entire peripheries of the first and second seals at predetermined positions of thereof, a casing for supporting the first and second seals, and a passage communicating between a gap between the first seal or the second seal and the casing, with a space defined by the first seal, the second seal and the rotary shaft.

In this configuration of the present invention, with the provision of the passage communicated with the space defined by the first and second seals and the rotary shaft, air enters into the space by way of the passage even in an excessive lubrication state so that no negative pressure is induced in the space, and accordingly, the oil seal can be prevented from being extraordinarily worn, thereby it is possible to enhance the durability of the oil seal.

Further, since the passage is formed in a gap in a part of the first seal or the second seal, which is covered by the casing, lubrication oil can hardly enter even in an excessive lubrication state from the passage into the space defined by the first seal, the second seal and the rotary shaft while air can satisfactorily enter thereinto.

In the oil seal according to the present invention, the passage is constituted by at least one communication hole which is formed in at least either the first seal or the second seal, and it is desirable that the communication hole is formed in a part other than a seal part of the first and/or second seal.

In this configuration of the present invention, since the communication hole is formed as the passage in the first and/or second seal, the passage can be simply formed, and accordingly, the manufacture of the oil seal can be facilitated. Further, since the communication hole is formed in the part other than the seal part, the passage for air is surely ensured, thereby it is possible satisfactorily to introduce the air.

In the oil seal according to the present invention, the passage is preferably a groove which is formed in at least either one of mating surfaces of the first and second seals, piercing through the seal part.

In this configuration of the present invention, with the provision of the groove piercing through the sealed part, the passage is communicated up to a position on the outer peripheral side of the sealed part, and accordingly, the possibility of making direct contact with lubrication oil becomes minimum, thereby it is possible to surely ensure a passage for air.

An oil seal according to the present invention, which is provided at the outer peripheral position of a rotary shaft, for sealing two liquids, that is, a first liquid and a second liquid, is characterized by a first seal for sealing a first liquid side of the rotary shaft, a second seal for sealing a second liquid side of the rotary shaft, a seal part for sealing the first and second seals over the entire peripheries thereof at predetermined positions, and a casing for supporting the first and second seals, the casing defining therein a seal chamber formed therein with a hole which is communicated with a space defined by the first seal, the second seal and the rotary shaft.

In this configuration of the present invention, with the provision of the seal chamber in the casing, which is communicated with the space defined by the first seal, the second seal and the rotary shaft, air flows into the space from the seal chamber, and accordingly, no lubrication oil flows thereinto. Further, since the seal chamber is prevented from making contact with the lubrication oil, no risk of blocking the passage with the lubrication oil occurs, thereby it is possible to satisfactorily eliminate negative pressure in the space.

An oil seal according to the present invention, which is provided at the outer peripheral position of a rotary shaft, for sealing two liquids, that is, a first liquid and a second liquid, is characterized by a first seal for sealing a first liquid side of the rotary shaft, a second seal for sealing a second liquid side of the rotary shaft, a seal part for sealing the first and second seals over the entire peripheries thereof at predetermined positions, a casing for supporting these first and second seals, the first and second seals being made of polytetrafluoroethylene (PTFE), and at least either the first seal or the second seal being formed with a communication hole as a passage in a part which is not covered thereover with the casing.

In this configuration of the present invention, since the oil seal is made of PTFE, it is excellent in wear-resistance and heat-resistance, and accordingly, it is comparatively effective particularly in use under a severe condition, such as use at a high temperature. Further, since PTFE has relatively high stiffness so that close contact with the peripheral surface of the rotary shaft is insufficient, it has been considered that air flows into the space defined by both seals and the rotary shaft, and therefore, no consideration has been made of negative pressure induced in the space. Since the communication hole is formed in the oil seal made of PTFE, in addition to the performance conventionally obtained, no extraordinary abrasion occurs even in a state of excessive lubrication, and accordingly, it is more excellent in durability. Thus, this effect is remarkable even in such a case that the communication hole is formed in a part which is not covered with the casing.

In view of the above-mentioned oil seal according to the present invention, it is preferable to lay the rotary shaft in a horizontal direction and to form the passage above the center of the rotary shaft.

In this configuration of the present invention, in the case of a state of excessive lubrication, even though lubrication oil flows from a position above the rotary shaft to a position therebelow under the gravitation, the passage can be blocked by the lubrication oil since the passage is formed above the center of the rotary shaft, and accordingly, air surely flows into the space defined by the first seal, the second seal and the rotary shaft, thereby it is possible to surely eliminate negative pressure.

DETAILED DESCRIPTION OF THE PREFERRED EMBODIMENTS

Figure 1:
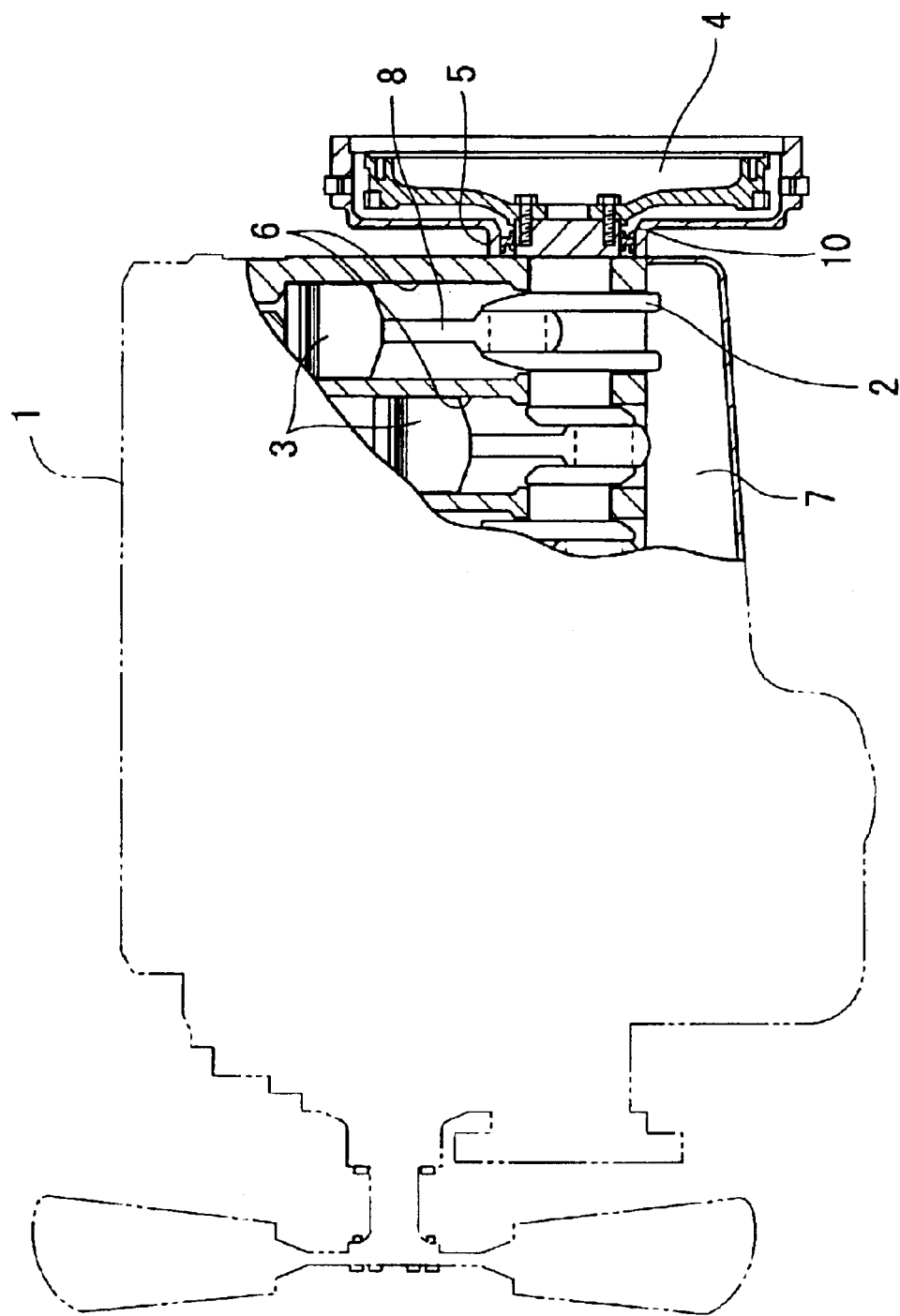
FIG. 1 is a partially sectioned view illustrating an engine according to a first embodiment of the present invention.

Explanation will be made of several embodiments of the present invention with reference to the accompanying drawings. It is noted that like reference numerals are used to denote like parts in these embodiments in order to abbreviate or omit the explanation thereof.

[First Embodiment]

Referring to FIG. 1 which is a partially sectioned view illustrating an engine 1 according to a first embodiment, the engine 1 incorporates a plurality of cylinders 6 formed therein, a plurality of pistons 3 which receive a pressure of combustion gas in the respective cylinders 6 so as to reciprocate therein, a crank shaft 2 as a rotary shaft for converting the reciprocating motion of the pistons 3 into a rotary motion. Each piston 3 is coupled to the crank shaft 2 through the intermediary of connecting rods 8, respectively, so as to be reciprocatable.

Engine oil as lubrication oil is fed to slide parts between the cylinders 6 and the pistons 3 and between the pistons 3 and the crank shaft 2. The engine oil is reserved in an oil pan 7 provided in the lower part of the engine, and is sucked up by an oil pump or the like which is not shown. Thereafter, the engine oil is fed into the cylinders 6 and to the pistons 3 and to the crank shaft 2, and then is returned to the oil pan 7 under the gravitation.

A disc-like flywheel 4 is provided at one end of the crank shaft 2 so as to restrain rotational variation thereof caused by the pistons 3 in order to obtain smooth operation. Further, a transmission (which is not shown) for transmitting a torque to a drive axle is coupled to the flywheel 4 on the side remote from the crank shaft 2 coupled thereto. The flywheel 4 has at its outer periphery a gear adapted to be engaged with a pinion, and further, the transmission has several gears meshed with each other for carrying out power transmission. Thus, it is required to properly lubricate them. Accordingly, lubrication oil different from the engine oil is fed to them, and therefore, the flywheel 4 and the transmission are driven in the atmosphere of this lubrication oil for lubrication thereof.

As stated above, different lubrication oils are used on the engine 1 side and the flywheel 4 side, respectively, the crank shaft 2 is provided thereto with an two-liquid type oil seal 10 for preventing lubrication oil on the engine 1 side and lubrication oil on the flywheel 4 side from entering into one to the other of these sides. This oil seal 10 is fixed, being fitted between the outer periphery of the crank shaft 2 and the inner periphery of a flywheel housing 5.

It is noted that there are used engine oil on the engine 1 side and lubrication oil on the flywheel 4 side, which have substantially the same components. Even in this case, the engine oil is used usually at a high temperature, and therefore, it deteriorates due to aging effect. Thus, it has to be frequently exchanged, in comparison with the lubrication oil on the flywheel 4 side, and accordingly, it is required that they are isolated from each other by means of the oil seal 10. Thus, the oil seal 10 in this embodiment is of a two liquid type for serving the lubrication oil on the flywheel 4 side as a first liquid and the engine oil on the engine 1 side as a second liquid.

Figure 2:
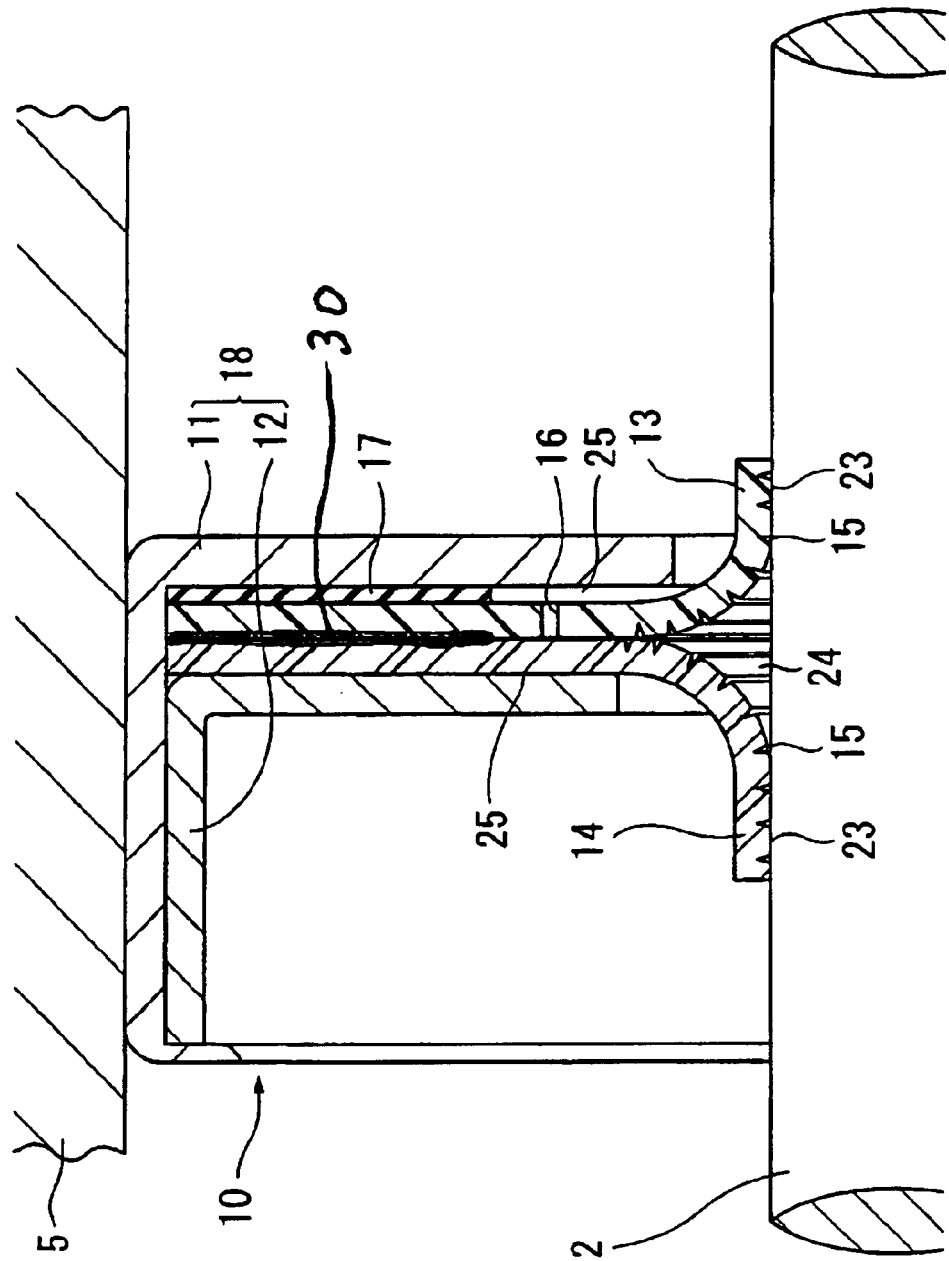
FIG. 2 is an enlarged sectional view illustrating a part of an oil seal according to the first embodiment of the present invention.

As shown in FIG. 2, the oil seal 10 incorporates a first seal 13 for sealing the flywheel 4 side, a second seal 14 for sealing the engine 1 side, a casing 18 fitted in the flywheel housing 5 for supporting the first seal 13 and the second seal 14, and a gasket 17 for sealing the first seal 13 and the second seal 14.

The first seal 13 and the second seal 14 are ring-like sheet members made of polytetrafluoroethylene (PTFE), the first seal 13 is curved at its inner peripheral side toward the flywheel 4 side, and the second seal 14 is curved at its inner peripheral side toward the engine 1 side. These inner peripheral parts define seal surfaces 23 which are made into press contact with the crank shaft 2 so as to seal the crank shaft 2, and the seal surfaces 23 are formed therein with spiral grooves 15, respectively, being extended from the outer peripheral side to the inner peripheral side. Thus, a portion which is surrounded by the first seal 13, the second seal 14 and the crank shaft 2 can be obtained since the first seal 13 and the second seal 14 are curved toward the opposite sides, respectively, so as to define a space 24 which are isolated from both flywheel 4 side and the engine 1 side. Further, the first seal 13 is formed therein a communication hole 16 as a passage for the space 24, which will be detailed later.

The casing 18 incorporates an outer casing 11 making contact with the flywheel housing 5 and an inner casing 12 making contact with the outer casing 11. The outer casing 11 and the inner casing 12 are metal ring members each having a L-like sectional shape, and the first seal 13 and the second seal 14 are held therebetween.

A gasket 17 made of rubber is interposed between the first seal 13 and the outer casing 11. By calking the outer casing 11 to the inner casing 12, the gasket 17 is pressed between the outer casing 11 and the first seal 13 so as to increase the bearing between the outer casing 17 and the first seal 13 within the part where the gasket 17 is present, thereby it is possible to seal the first seal 13 and the second seal 14. The gasket 17 is extended over a part of the outer peripheral side of the outer casing 11 and the first seal 13, and accordingly, this part serves as a seal part 30. Gaps 25 which are not sealed are defined between the first seal 13 and the outer casing 11 and between the second seal 14 and the inner casing 12 in a part which is inside of the seal part 30 defined by the gasket 14 although they make contact with each other. It is noted that the gasket 17 and the gaps 25 are exaggerated in large scales in FIG. 2 for the sake of easy understanding thereof.

A communication hole 16 is formed within the gap 25 on the first seal 13 side, right above the rotational center of the crankshaft 2. The communication hole 16 has a size and a shape which is suitably determined so as to smoothly suck air from the gap 25, that is, for example, a circular hole having a diameter of few millimeters may be used therefor. The communication hole 16 pierces through the first seal 13, thicknesswise of the latter. Thus, the space 24 and the gap 25 are communicated with each other therethrough.

When the engine 1 having the above-mentioned configuration is started, the pistons 3 are reciprocated by combustion gas, and accordingly, the crank shaft 2 is rotated. Since the crank shaft 2 slides on the seal surfaces 23, the oil seal 10 seals against the lubrication oil on the flywheel 4 side by means of the first seal 13 and the engine oil on the engine 1 side by means of the second seal 14. If the lubrication oil or the engine oil tends to enter into the space 24, the engine oil or the lubrication oil which is to enter during the rotation is spirally shifted in association with the rotation so as to be forced toward the outside of the oil seal 10. Further, for example, in a condition of excessive lubrication in which the supply or the lubrication oil and the engine oil is excessive so that the first seal 13 and the second seal 14 are soaked respectively in the lubrication oil and the engine oil, the lubrication oil and the engine oil are continuously forced out, and the air in the space 24 becomes less while air is inhibited from flowing into the space 14 from the seal surface 23 side. Then, the oil seal 10 sucks air from the outside thereof into the gap 25 between the outer casing 11 and the first seal 13 through the communication hole 16 so as to eliminate negative pressure in the space 24.

In view of the embodiment as stated above, there can be offered the following advantages:

(1) since the communication hole 16 communicating between the space 24 and the gap 25 is provided in the oil seal 10, air is sucked through the communication hole 16 so as to eliminate negative pressure in the space 24 even in a sate of excessive lubrication, so as to avoid extraordinary abrasion of the oil seal 19, thereby it is possible to enhance the durability of the oil seal;

(2) since the communication hole 16 is formed in a part which is covered with the casing 18, no lubrication oil splashes onto the communication hole 16, and accordingly, the communication hole 16 is prevented from being blocked, thereby it is possible to always suck the air satisfactorily;

(3) since the communication hole 16 is located right above the rotational center of the crank shaft 2, lubrication oil does never enter and build up in the gap 25, and the communication hole 16 is prevented from being blocked by the lubrication oil or from sucking therethrough the lubrication oil even when the lubrication oil flows downward under the gravitation so as to satisfactorily suck the air, thereby it is possible to surely eliminate negative pressure;

(4) since the communication hole 16 is formed in the first seal 13, during a manufacture of the oil seal, the casing 18 can be assembled and then calked even after a sheet like first seal 13 has been formed therein with a hole, thereby it is possible to simplify the manufacture thereof with no complicated manufacturing process; and (5) since the first seal 13 and the second seal 14 are made of PTFE, they are excellent in wear-resistance and heat-resistance, the oil seal can be used at a high temperature as in an engine, and further, since the oil seal 10 formed of PTFE is provided therein with the communication hole 16, occurrence of negative pressure can be avoided by the communication hole 16 so as to prevent occurrence of extraordinary abrasion even in a case of excessive lubrication, thereby it is possible to further enhance the durability.

[Second Embodiment]

Next, explanation will be made of a second embodiment of the present invention. The second embodiment is similar to the first embodiment, except that the gasket 17 as stated in the first embodiment is provided between the first seal 13 and the second seal 14.

Figure 3:
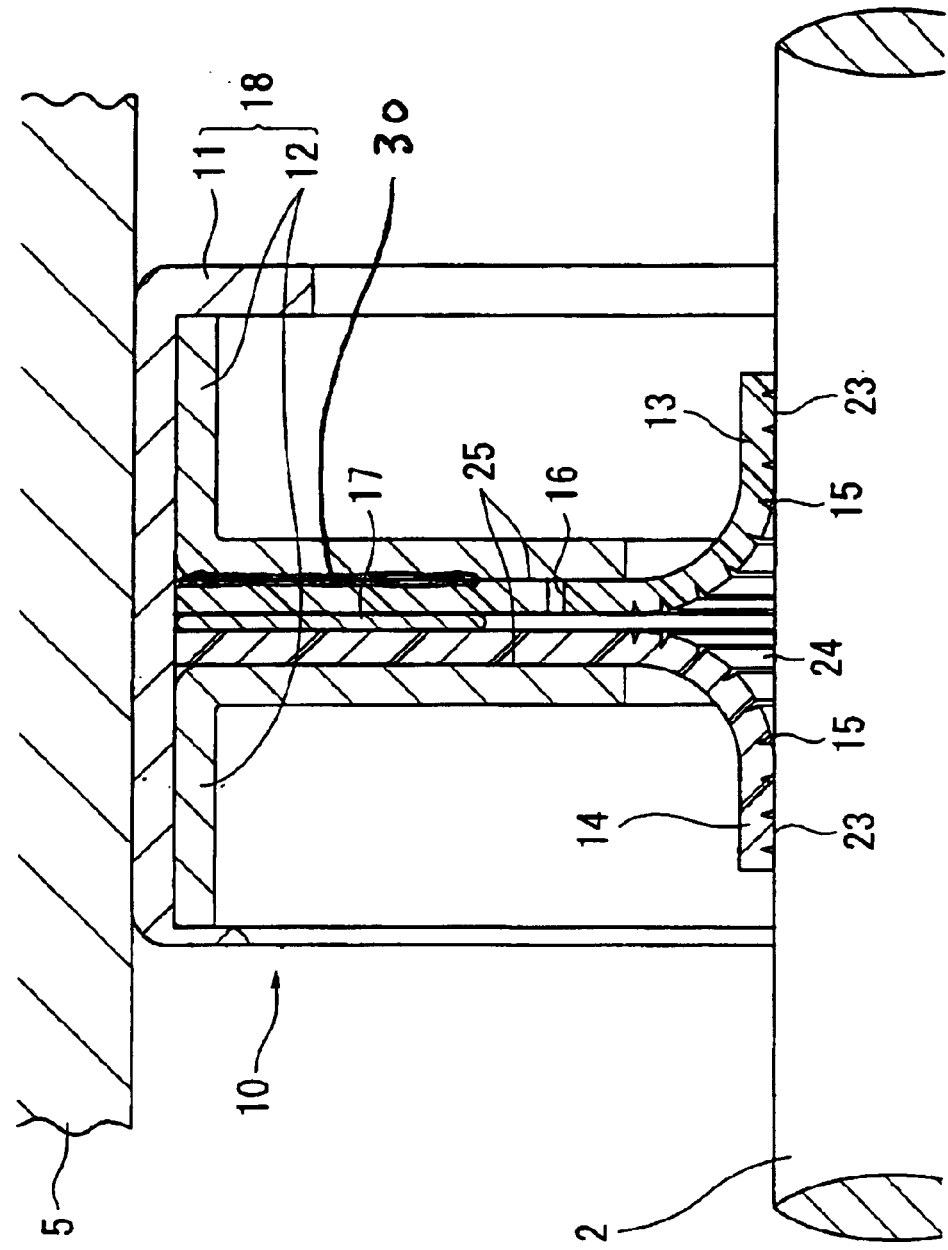
FIG. 3 is an enlarged sectional view illustrating a part of an oil seal according to a second embodiment of the present invention.

Referring to FIG. 3, the inner casing 12 is provided on the inner peripheral side of the outer casing 11, and is composed of two L-like cross-sectional shape ring-like members which are arranged so as to be plan symmetric, the first seal 13, the second seal 14 and the gasket 17 being interposed between the two inner casings 12. The gasket 17 is formed of a ring-like sheet made of paper or the like, and is arranged so as to cover a part of the outer peripheral side between the first seal 13 and the second seal 14.

In such an oil seal 10, the outer casing 11 is calked on to the inner casings 12 so as allow the inner casings 12 to fix the second seal 14 and the gasket 17 on both sides, and accordingly, the bearing between the first seal 13 and the second seal 14 in the part where the gasket 17 is laid is increased so as to create the seal part 30. Thus, the gaps 25 are defined between the first seal 13 or the second seal 14 and the inner casings 12 on the inner peripheral side of the gasket 17, the gaps 25 being not sealed although the seals and the inner casings 12 are made into contact with each other within the gap 25. Further, the first seal 13 is formed therein with the communication hole 16 communicating the gap 25 between the first seal 13 and the inner casing 12 with the space 24, right above the rotational center of the crank shaft 2.

In the above-mentioned embodiment, there may be offered advantages similar to the advantages (1), (2), (3), (4) and (5) in the first embodiment.

[Third Embodiment]

Next, explanation will be made of a third embodiment of the present invention. The third embodiment is similar to the first embodiment, except that a groove is formed between the mating surfaces of the first seal 13 and the second seal 14, instead of the communication hole 16 in the first embodiment.

Figure 4:
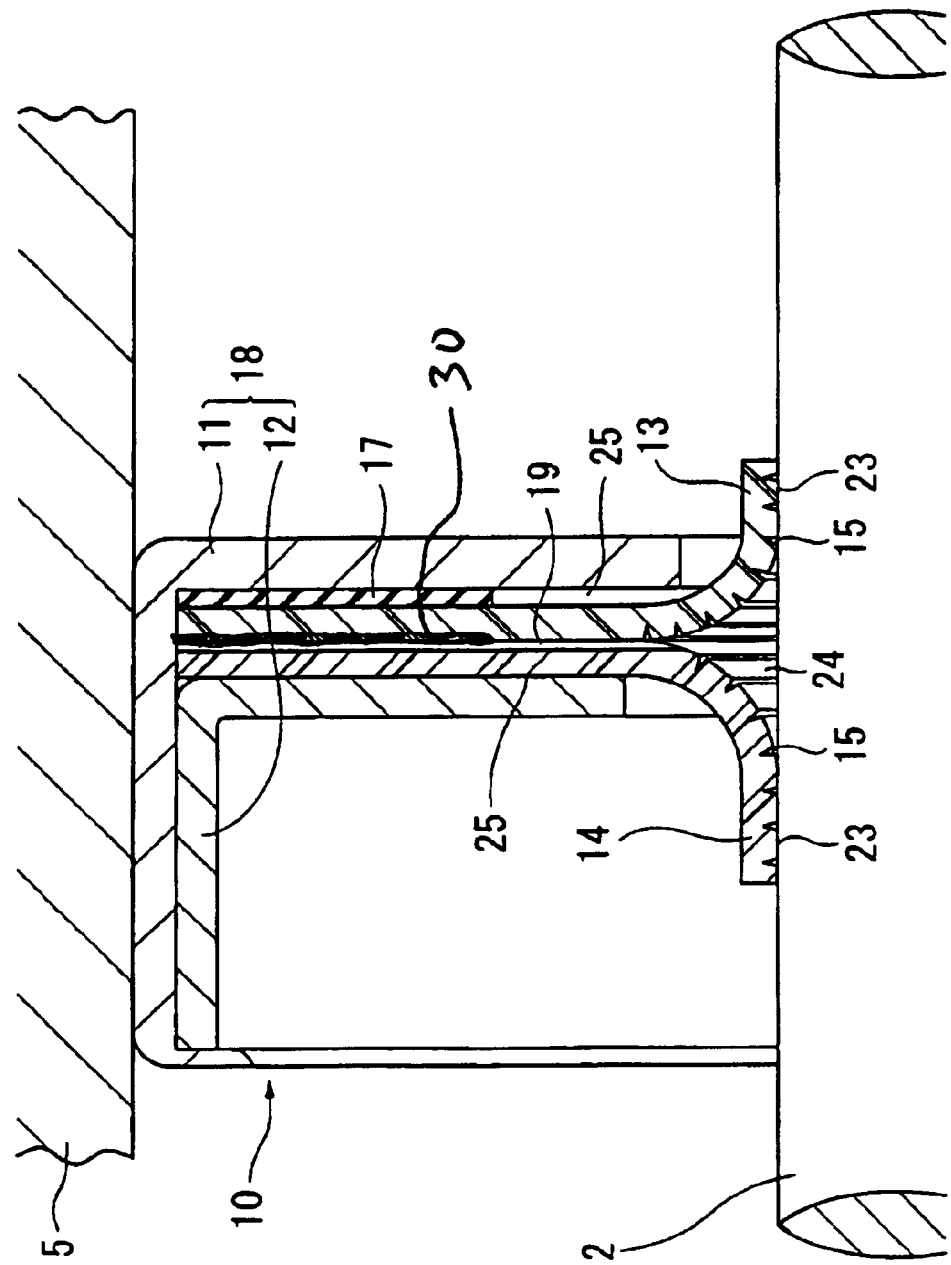
FIG. 4 is an enlarged sectional view illustrating a part of an oil seal according to a third embodiment of the present invention.

Referring to FIG. 4, the second seal 14 is formed with a communication groove 19 extending from the space 24 to the outer casing 11, right above the rotational center of the crank shaft 2, in a part between the mating surfaces of the first seal 13 and the second seal 14. This communication groove 19 is formed, extending through the seal part 30 defined by the gasket 17. With this arrangement, the surface pressure in the seal part 30 is reduced so as to eliminate the seal condition of this part, and accordingly, a passage for the air is created. Thus, the air flows between the outer casing 11 and the inner casing 12 and through the communication groove 19, and is then sucked into the space 24, resulting in elimination of negative pressure.

With the embodiment as stated above, since the communication groove 19 has a role of the communication hole 16 in the first embodiment, there may be offered advantages which are similar to the advantages (1), (2), (3), (4) and (5) offered by the first embodiment although the configuration thereof is different from that of the first embodiment. Further, in this embodiment, there may be offered the following advantage:

(6) since the communication groove 19 is formed in the part which is covered with the outer casing 11, and the air is sucked through the gap between the outer casing 11 and the inner casing 12, the possibility of entrance of the engine oil and the lubrication into the communication groove 19 can be remarkably reduced, thereby it is possible to always suck the air satisfactorily.

[Fourth Embodiment]

Explanation will be made of a fourth embodiment which is similar to the third embodiment, except that a communication groove is formed by clamping an elongated member, in stead of forming the communication groove in the second seal 14.

Figure 5:
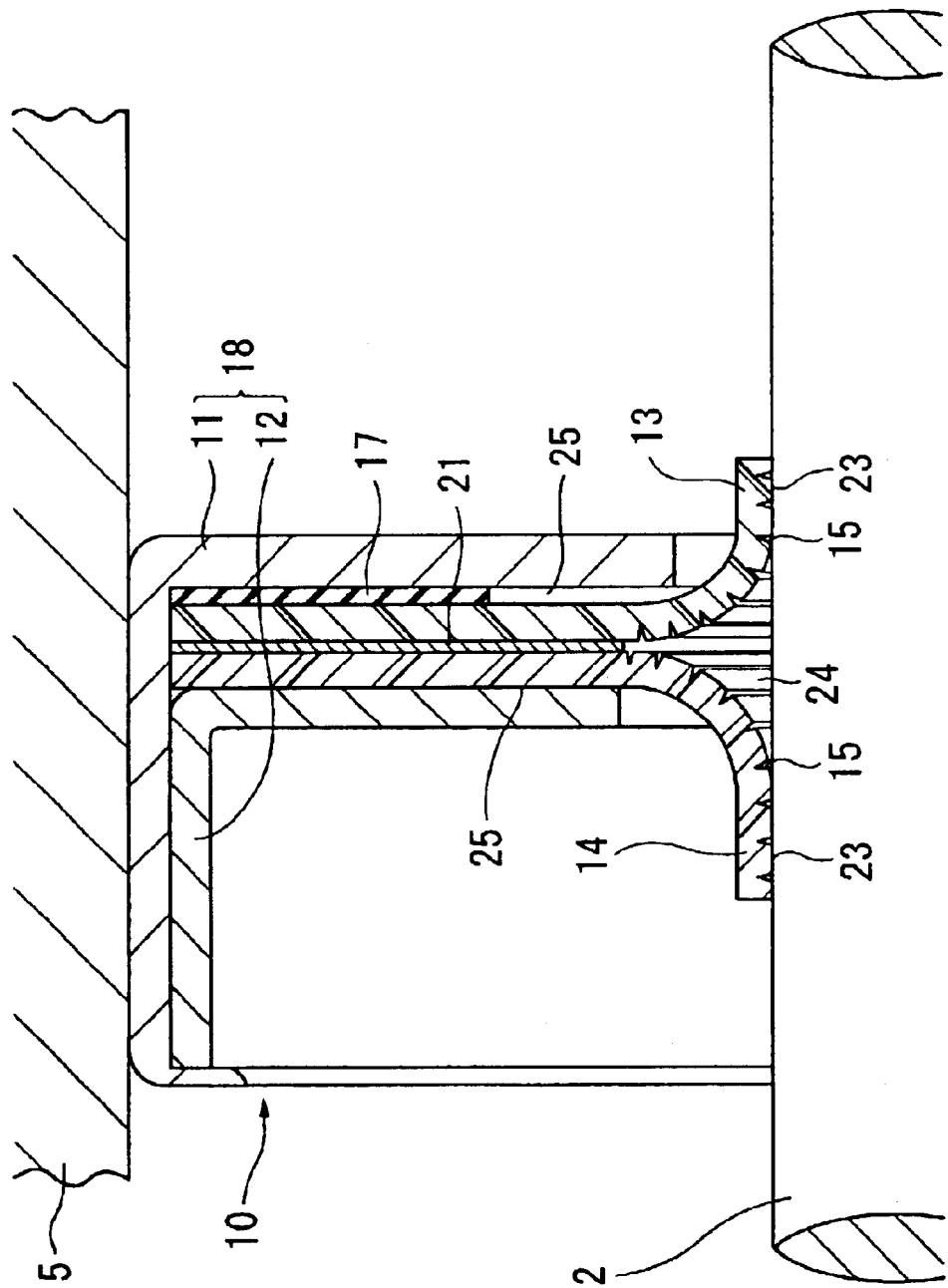
FIG. 5 is an enlarged sectional view illustrating a part of an oil seal according to a fourth embodiment of the present invention.
Figure 6:
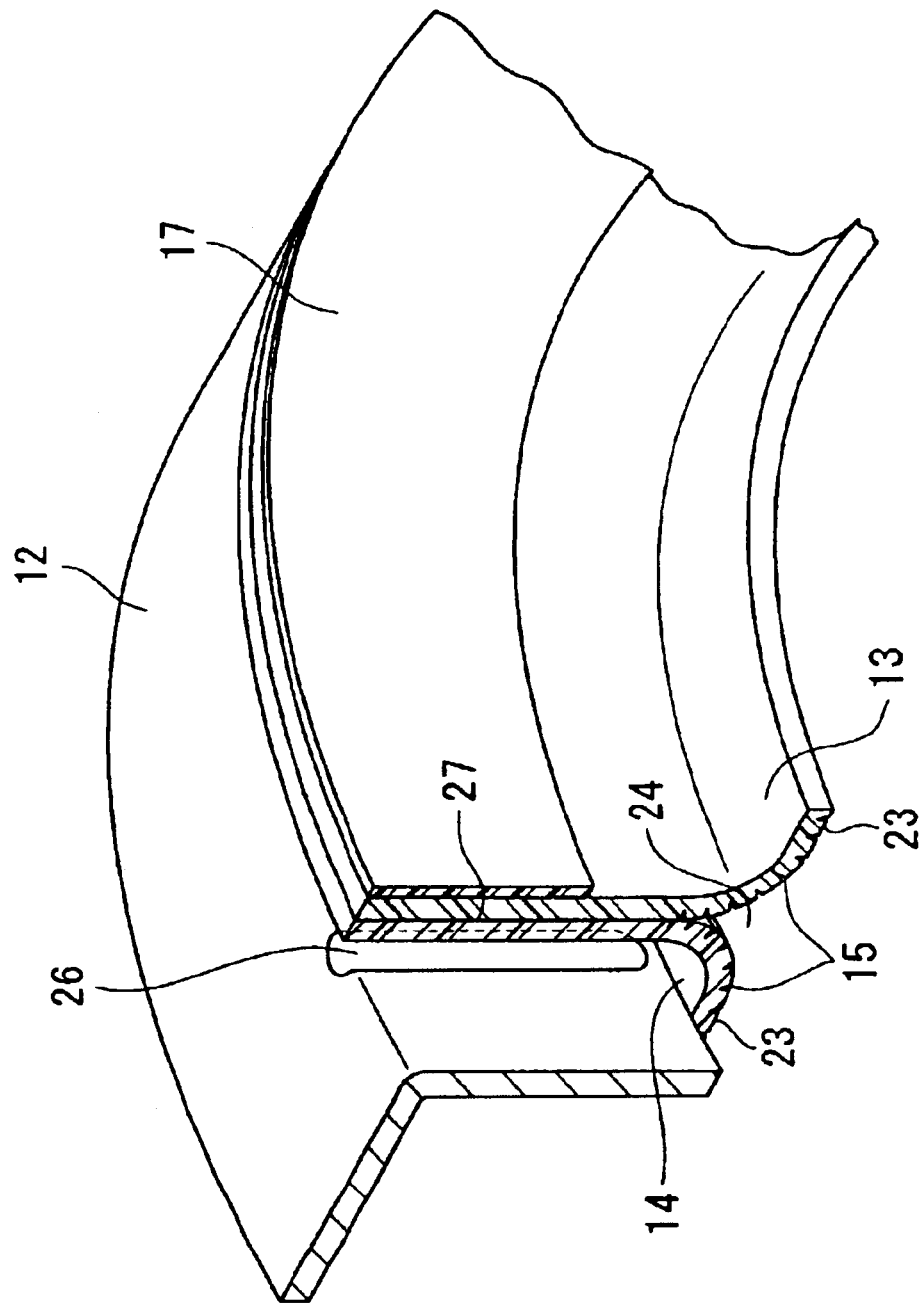
FIG. 6 is an enlarged view illustrating a part of the oil seal according to a fifth embodiment of the present invention.

Referring to FIG. 5, an elongated member 21 having such a length that it extends from the space 24 to the outer casing 11 is interposed between the first seal 12 and the second seal 14. This elongated member 21 is formed of a fishing line, a metal wire, a wire or the like, having such a stiffness that it cannot be collapsed even by calking force applied to both sides thereof, but the first seal 13 and the second seal 14 on both sides thereof are deformed so as to form gaps defined by the first seal 13, the second seal 14 and the elongated member 21, that is, these gaps have a role of the communication groove. The air flows between the outer casing 11 and the inner casing 12 and through the communication groove formed by the elongated member 21, and then finally flows into the space 24.

With the configuration of the above-mentioned embodiment, there may be offered advantages similar to the advantages (1), (2), (3), (4), (5) and (6) obtained by the first and the third embodiments, and in addition, there may be offered the following advantage; (7) that is, since the communication groove can be formed by interposing the elongated member 21, during a manufacture of the oil seal, the first seal 13, the second seal 14 and the gasket 17 may be fixed by calking the outer casing 11 in order to assemble the oil seal after the elongated member 21 is arranged, a process for fabricating a groove or a hole in the first seal 13 or the second seal 14 is not required, thereby it is possible to further simplify the manufacturing process.

[Fifth Embodiment]

Explanation will be made of a fifth embodiment which is similar to the third embodiment, except that the passage formed in the second seal is obtained by forming a groove in the casings. Referring 6, a part of the casing 18 which does not make contact with the gasket 17, that is, a part located right above the rotational center of the crank shaft 2 on the inner casing 12 side, is formed therein with a passage forming groove 26 having a length which is longer the seal part 30 created by the gasket 17, but which does not extend through the inner casing 12. Since this passage forming groove 26 is formed piercing through the seal part 30, the bearing of this part is reduced so as to eliminate the sealing condition, and accordingly, a passage through which the air flows is formed between the first seal 13 and the second seal 14. Thus, the air flows between the outer casing 11 and the inner casing 12 and through a communication part 27 between the first seal 13 and the second seal 14, and the air is then sucked into the space 24.

With the configuration of the above-mentioned embodiment, there may be offered advantages similar to the advantages (1), (2), (3), (4) and (5) offered by the first embodiment, and in addition, the following advantage may be obtained: that is, (8) since the passage forming groove 26 does not pierce through the inner casing 12, the possibility of entrance of engine oil through the passage forming groove 26 is remarkably low, thereby it is possible to always suck the air satisfactorily.

[Sixth Embodiment]

Explanation will be hereinbelow made of a sixth embodiment of the present invention which is similar to the second embodiment, except that a seal chamber is formed in the inner casing 12 and the communication hole 16 in the first seal 13 is communicated with this seal chamber.

Figure 7:
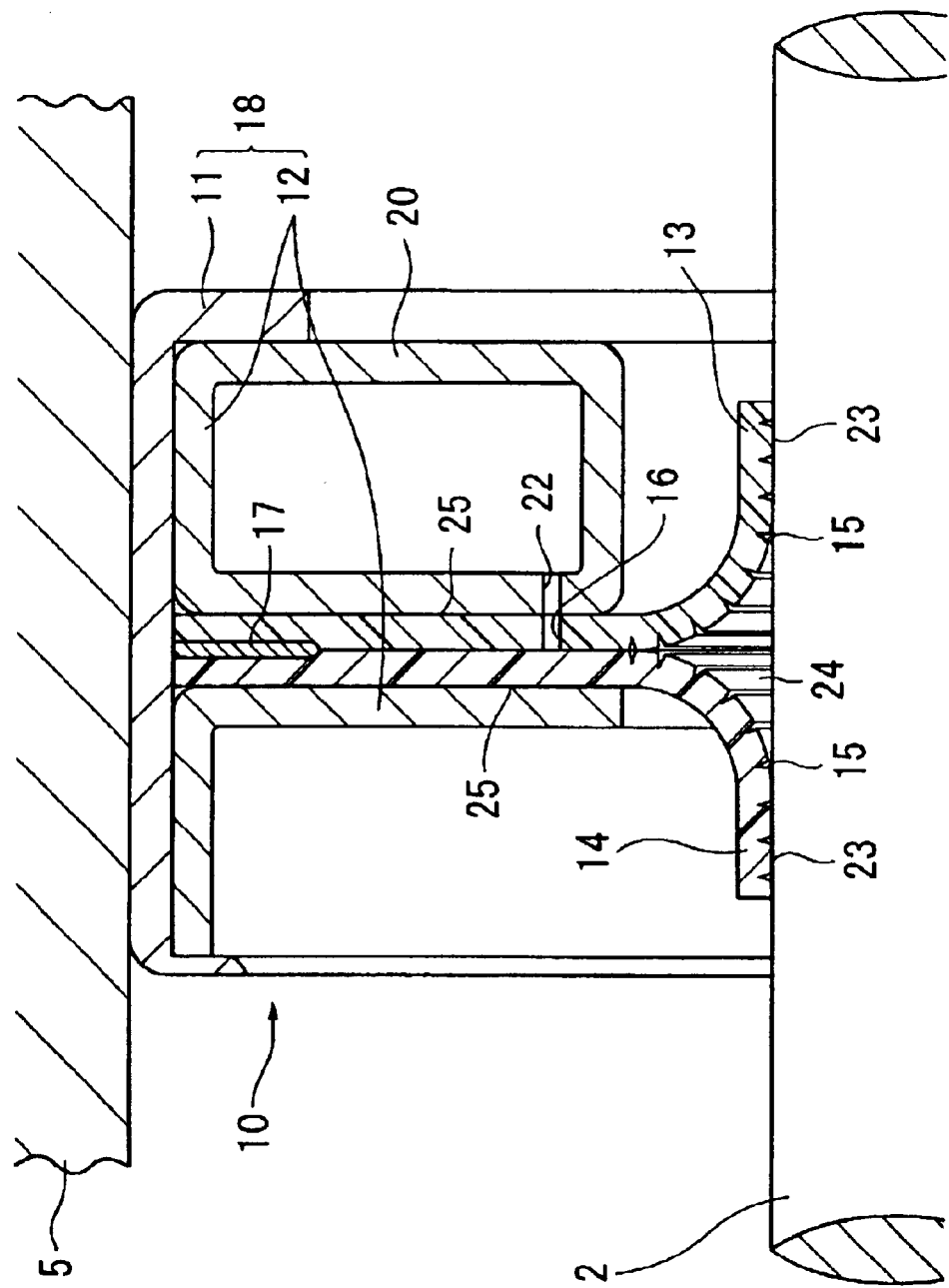
FIG. 7 is an enlarged sectional view illustrating a part of an oil seal according to a sixth embodiment of the present invention.

Referring to FIG. 7, the inner casing 12 is composed of an L-like sectional shape member provided on the engine 1 side, similar to the second embodiment, and a hollow annular seal chamber 20. The first seal 13, the second seal chamber 14 and the gasket 17 made of paper or the like, are fixed and sealed by one side of the seal chamber 20 and the L-like sectional shape inner casing 12 by calking the outer casing 13 to the inner casing 12.

The first seal 13 is formed therein the communication hole 16 as a passage similar to the second embodiment. Further, a hole 22 is formed in the seal chamber 20 in a part corresponding to the communication hole 16, and accordingly, the space 24 is communicated with the seal chamber 20 through the communication hole 16 and the hole 22.

It is noted that the communication hole 16 and the hole 22 may not be provided in such a way that they are communicated with the gap 25. For example, in such a case that the first seal 13 and the seal chamber 20 are sealed by means of an adhesive in stead of the gasket 17, the communication with the communication hole 16 and the hole 22 may be made piercing through the adhesive.

With the oil seal 10 having the configuration of this embodiment, the oil seal 10 sucks the air from the seal chamber 20 through the communication hole 16 and 22 when the air amount in the space 24 decreases so as to eliminate negative pressure in the space 24. Here, there may be offered advantages similar to the advantages (1), (2), (3), (4) and (5), and in addition, the following advantage can be obtained: (9) that is, since the passage for the air is communicated with the seal chamber 20, no lubrication oil outside the oil seal does enter into the seal chamber 20, and accordingly, the hole 22 and the communication hole 16 are prevented from being blocked by the lubrication oil, thereby it is possible to suck the air, surely and satisfactorily.

Variant Example

It is noted that the present invention should not be restricted to the embodiments as stated above, and accordingly, the present invention should include various variant forms, modifications and the like thereof with the scope which can achieve the object of the present invention.

For example, although the first seal 13 is formed therein with the communication hole 16 in the first embodiment, the present invention should not be limited to this configuration, but the second seal 14 may be formed therein with the communication hole 16 or both fist seal 13 and the second seal 14 may be formed therein with the communication holes 16. In other words, it may be formed in at least one of the first seal 13 and the second seal 14. Further, similarly, in the sixth embodiment, the communication hole 16 may be formed in the second seal 14 while the seal chamber 20 is provided on the engine 1 side, and the communication hole 16 and the hole 22 of the close chamber 20 are communicated with each other. Alternatively, both first seal 13 and second seal 14 are formed therein with the communication holes 16.

Further, in the fourth embodiment, although the communication groove 19 is formed by the elongated member 21, the invention should not be limited to this configuration, but for example, a hollow rod-like member may be interposed between the first seal 13 and the second seal 14 so that the communication groove is defined by the hollow part of the rod-like member. In other words, it is sufficient that a passage is formed between the first seal 13 and the second seal 14, extending from the space 24 and the outer casing 11 and piercing through the seal part.

In the fifth embodiment, although the passage forming groove 26 is formed in the inner casing 12, it may be formed in the second seal 14 in a surface which makes contact with the inner casing 12, or it may be formed in each of both second seal 14 and the inner casing 12. In other words, it may be formed in at least one of the second seal 14 and the inner casing 12.

Further, although the passage forming groove 26 is formed in such a way that it does not pierce through the inner casing 12 in the fifth embodiment, it is not always required to form the groove 26 which does not pierce therethrough, but even though it pieces therethrough, the objects of the present invention can be achieved.

Further, although it has been explained that the engine oil and the lubrication oil for which the oil seal 10 seals, have substantially the same components, they may have completely different components. Further, although the two liquids are the engine oil on the engine 1 side, and the lubrication oil on the flywheel side 4 side, the oil seal 10 can seal other liquids. Further, the oil seal 10 may be used in a part of a machine rather than the engine 1, in which it seals two liquids.

The first seal 13 and the second seal 14 may be made of not only PTFE but also any material which is suitably selected, such as fluoride rubber, silicone rubber, nitric rubber or the like.

Although the gasket 17 is interposed between the first seal 13 and the seal chamber 20 in the sixth embodiment, the present invention should not be limited to this configuration, but it may be provided on the second seal 14 side, and also a gasket made of paper or the like, may be interposed between the first seal 13 and the second seal 14. Further, in the above-mentioned embodiments, sealing may be made between the first seal 13 and the second seal 14 or the case 18 by means of an adhesive instead of the gasket 17.

Although it has been explained that the communication hole 16, the communication groove 19 or the communication part 27 is provided at the position right above the rotational center of the crank shaft 2, the present invention should not be restricted to this configuration, but if it is provided above the rotational center of the crank shaft 2, the engine oil and the lubrication oil can be satisfactorily prevented from entering into the oil seal. Further, even though it is not always provided the above, the objects of the present invention may be achieved.

Figure 8:
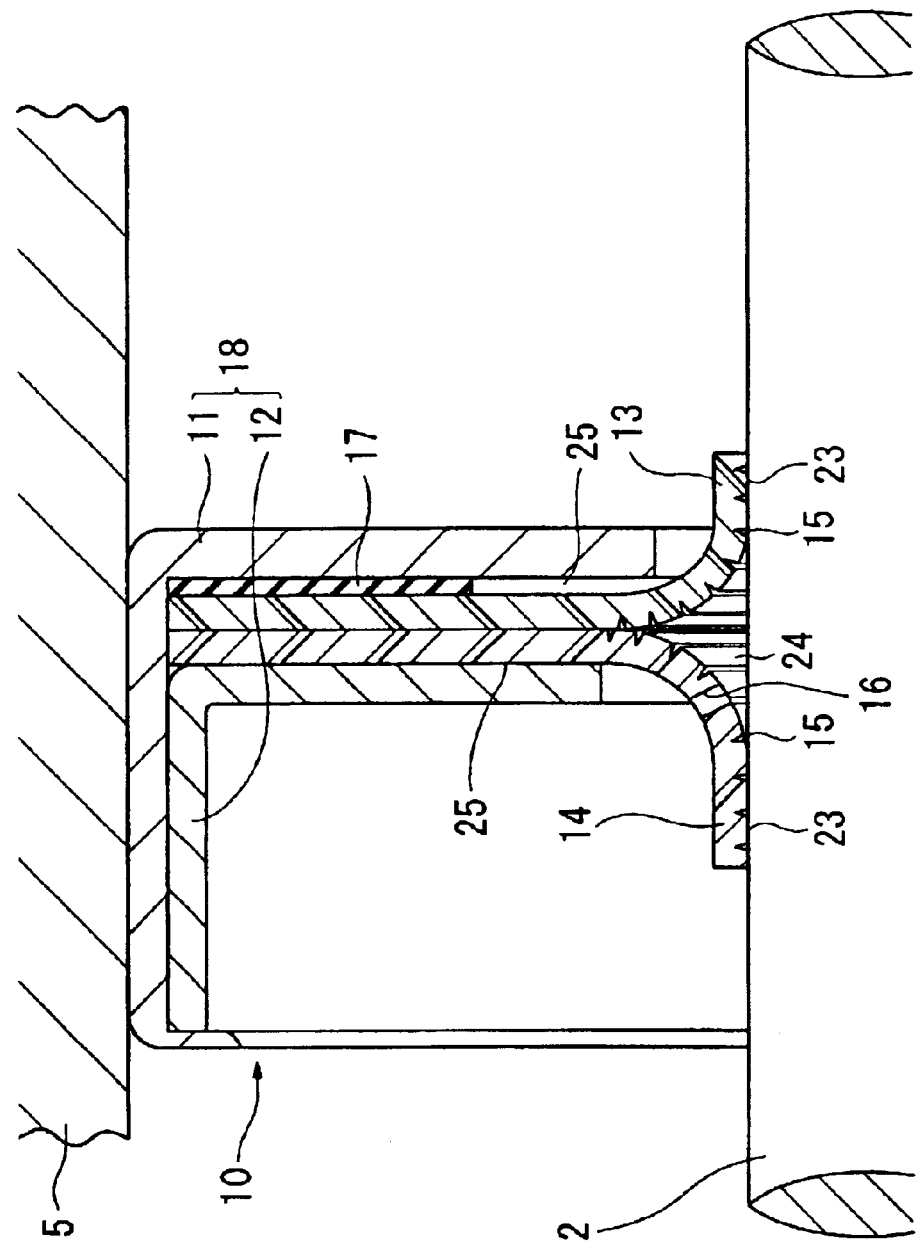
FIG. 8 is an enlarged sectional view illustrating a variant form of an oil seal in the present invention.

Although it has been explained that the communication hole 16, the communication groove 19 or the communication part 27 is provided in the part which is covered with the casing 18, the objects of the present invention can be achieved even though a passage is formed in a part which is not covered with the casing 18. For example, as shown in FIG. 8, even though the communication hole 16 is formed in the second seal 14 in a part which is not covered with the casing 18, negative pressure induced in the space 24 can be eliminated by introducing the air through this communication hole 16.

In the case of the first and second seals 13, 14 which are made of PTFE, since assumption could hardly be made conventionally as to negative pressure induced in the space 24, it is extremely effective to provide the space 24 with a passage such as the communication hole 16, the communication groove 19 or the communication part 27 in order to eliminate negative pressure.

What is claimed is:

1. An oil seal provided on an outer circumference of a rotary shaft, the oil seal sealing a first liquid disposed on a first side and a second liquid disposed on a second side, the oil seal comprising:
   a first seal for sealing the first side of the rotary shaft;
   a second seal for sealing the second side of the rotary shaft;
   a sealed space formed by the first seal, the second seal and the rotary shaft;
   a casing which holds the first seal and the second seal;
   a sealing section interposed at a position where the first seal and the second seal are held by the casing to form a sealing portion through which a circulation of the first liquid and/or the second liquid is prohibited, the sealing portion extending along the entire circumference of the casing; and
   a negative-pressure reducer having a communicating portion for operatively fluidly coupling the sealed space with the first side and/or the second side at a position other than the outer circumference of the rotary shaft, the communicating portion of the negative-pressure reducer being covered with the casing.

2. The oil seal according to claim 1, wherein the negative-pressure reducer is a channel formed by at least one communicating hole provided on at least one of the first seal or the said second seal, the communicating hole being provided on a portion other than the sealing portion.

3. The oil seal according to claim 2, wherein the rotary shaft is laid in a horizontal direction, and the negative pressure reducer is provided above the center of the rotary shaft.

4. The oil seal according to claim 1, wherein the channel is a groove formed on an attachment surface of the first seal and the second seal, the groove penetrating the sealing portion.

5. The oil seal according to claim 4, wherein the rotary shaft is laid in a horizontal direction, and the negative pressure reducer is provided above the center of the rotary shaft.

6. The oil seal according to claim 1, wherein the rotary shaft is laid in a horizontal direction, and the negative pressure reducer is provided above the center of the rotary shaft.

7. An oil seal provided on an outer circumference of a rotary shaft, the oil seal sealing a first liquid disposed on a first side and a second liquid disposed on a second side, the oil seal comprising:
   a first seal for sealing the first side of the rotary shaft;
   a second seal for sealing the second liquid side of the rotary shaft;
   a sealed space formed by the first seal, the second seal and the rotary shaft;
   a casing which holds the first seal and the second seal;
   a sealed chamber provided on the casing, the sealed chamber having a hole; and
   a channel operatively fluidly coupling the hole with the sealed space, wherein the sealed chamber is closed except for the channel.

8. The oil seal according to claim 7, wherein the rotary shaft is laid in a horizontal direction, and the negative pressure reducer is provided above the center of the rotary shaft.

* * * * *